(12) United States Patent
Yamamoto

(10) Patent No.: US 12,189,108 B2
(45) Date of Patent: *Jan. 7, 2025

(54) SAMPLE OBSERVATION DEVICE AND SAMPLE OBSERVATION METHOD

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,518

(22) Filed: Jun. 6, 2023

(65) Prior Publication Data

US 2023/0314782 A1    Oct. 5, 2023

Related U.S. Application Data

(63) Continuation of application No. 17/040,091, filed as application No. PCT/JP2019/003226 on Jan. 30, 2019, now Pat. No. 11,709,350.

(30) Foreign Application Priority Data

Apr. 9, 2018    (JP) ................ 2018-074865

(51) Int. Cl.
*G02B 21/00* (2006.01)
*G01N 21/49* (2006.01)
(Continued)

(52) U.S. Cl.
CPC ........... *G02B 21/008* (2013.01); *G01N 21/49* (2013.01); *G01N 21/6428* (2013.01);
(Continued)

(58) Field of Classification Search
None
See application file for complete search history.

(56) References Cited

U.S. PATENT DOCUMENTS

2005/0012989 A1    1/2005  Kei et al.
2006/0000962 A1    1/2006  Lmabayashi et al.
(Continued)

FOREIGN PATENT DOCUMENTS

CN    1766607 A    5/2006
CN    1900744 A    1/2007
(Continued)

OTHER PUBLICATIONS

International Preliminary Report on Patentability mailed Oct. 22, 2020 for PCT/JP2019/003226.
(Continued)

*Primary Examiner* — Talha M Nawaz
(74) *Attorney, Agent, or Firm* — Faegre Drinker Biddle & Reath LLP

(57) ABSTRACT

A sample observation device includes: an emission optical system that emits planar light to a sample on an XZ plane; a scanning unit that scans the sample in a Y-axis direction so as to pass through an emission surface of the planar light; an imaging optical system that has an observation axis inclined with respect to the emission surface and forms an image of observation light generated in the sample; an image acquisition unit that acquires a plurality of pieces of XZ image data corresponding to an optical image of the observation light; and an image generation unit that generates XY image data based on the plurality of pieces of XZ image data. The image generation unit extracts an analysis region of the plurality of pieces of XZ image data acquired in the Y-axis direction, integrates brightness values of at least the analysis region in a Z-axis direction to generate X image data, and
(Continued)

combines the X image data in the Y-axis direction to generate the XY image data.

12 Claims, 17 Drawing Sheets

(51) Int. Cl.
　　*G01N 21/64* (2006.01)
　　*G06T 5/50* (2006.01)
　　*G06T 5/70* (2024.01)

(52) U.S. Cl.
　　CPC ..... *G01N 21/6456* (2013.01); *G02B 21/0032* (2013.01); *G02B 21/0076* (2013.01); *G06T 5/50* (2013.01); *G06T 5/70* (2024.01); *G01N 2021/6439* (2013.01); *G06T 2207/10056* (2013.01); *G06T 2207/20224* (2013.01)

(56) References Cited

U.S. PATENT DOCUMENTS

| | | |
|---|---|---|
| 2008/0180385 A1 | 7/2008 | Yoshida et al. |
| 2009/0232370 A1 | 9/2009 | Adie et al. |
| 2010/0303386 A1 | 12/2010 | Enderlein |
| 2012/0097743 A1 | 4/2012 | Kotlarsky et al. |
| 2012/0205519 A1 | 8/2012 | Mohler et al. |
| 2012/0229531 A1* | 9/2012 | Yata ............... G02F 1/1336 345/697 |
| 2014/0127744 A1 | 5/2014 | Schroeder et al. |
| 2014/0340504 A1 | 11/2014 | Takamizawa |
| 2015/0130920 A1 | 5/2015 | Zou et al. |
| 2015/0371368 A1 | 12/2015 | Kitagawa et al. |
| 2016/0004058 A1 | 1/2016 | Wayne |
| 2016/0139394 A1 | 5/2016 | Taniguchi et al. |
| 2017/0276598 A1 | 9/2017 | Ikuyama |
| 2018/0031818 A1 | 2/2018 | Bassi et al. |
| 2018/0052315 A1 | 2/2018 | Huisken et al. |
| 2018/0074305 A1 | 3/2018 | Atzler et al. |
| 2018/0088308 A1* | 3/2018 | Liu ............... G02B 21/367 |
| 2018/0122077 A1* | 5/2018 | Wada ............... G06T 5/70 |
| 2018/0204047 A1* | 7/2018 | Yamashita ............. C12M 41/36 |
| 2019/0204577 A1* | 7/2019 | Faris ................. G02B 21/0088 |
| 2019/0244349 A1* | 8/2019 | Senda ................ G06T 5/92 |
| 2021/0398259 A1* | 12/2021 | Yamazoe ............. G06N 3/084 |

FOREIGN PATENT DOCUMENTS

| | | |
|---|---|---|
| CN | 101183079 A | 5/2008 |
| CN | 101576505 A | 11/2009 |
| CN | 101995652 A | 3/2011 |
| CN | 102105831 A | 6/2011 |
| CN | 102667473 A | 9/2012 |
| CN | 103207458 A | 7/2013 |
| CN | 103323442 A | 9/2013 |
| CN | 103516962 A | 1/2014 |
| CN | 104272721 A | 1/2015 |
| CN | 104301707 A | 1/2015 |
| CN | 105283791 A | 1/2016 |
| EP | 1498759 A2 | 1/2005 |
| EP | 3654019 A1 | 5/2020 |
| JP | S62-180241 A | 8/1987 |
| JP | S62-180241 U | 11/1987 |
| JP | 2001-209785 A | 8/2001 |
| JP | 2002-281308 A | 9/2002 |
| JP | 2007-251797 A | 9/2007 |
| JP | 2010-054420 A | 3/2010 |
| JP | 2012-138891 A | 7/2012 |
| JP | 2012-163777 A | 8/2012 |
| JP | 2013-166072 A | 8/2013 |
| JP | 2014-033358 A | 2/2014 |
| JP | 2014-155001 A | 8/2014 |
| JP | 2014-202967 A | 10/2014 |
| JP | 2015-031812 A | 2/2015 |
| JP | 2015-118378 A | 6/2015 |
| JP | 2015-537236 A | 12/2015 |
| JP | 2016-054999 A | 4/2016 |
| JP | 2017-504836 A | 2/2017 |
| JP | 2017-079440 A | 4/2017 |
| JP | 2017-090595 A | 5/2017 |
| JP | 2017-151132 A | 8/2017 |
| JP | 2018-010021 A | 1/2018 |
| JP | 2018-020179 A | 2/2018 |
| WO | WO 2014/056992 A1 | 4/2014 |
| WO | WO 2015/109323 A2 | 7/2015 |
| WO | WO 2017/151978 A1 | 9/2017 |

OTHER PUBLICATIONS

Vladimir Mastyugin et al., "A Quantitative High-Throughput Endothelial Cell Migration Assay", Journal of Biomolecular Screening, vol. 9, No. 8, Dec. 31, 2004.

Kevin M. Dean & Reto Fiolka, "Lossless Three-Dimensional Parallelization in Digitally Scanned Light-Sheet Flourescence Microscopy", Scientific Reports vol. 7, Aug. 24, 2017, p. 1-p. 6.

* cited by examiner

SAMPLE OBSERVATION DEVICE AND SAMPLE OBSERVATION METHOD

TECHNICAL FIELD

The present disclosure relates to a sample observation device and a sample observation method.

BACKGROUND ART

SPIM (Selective Plane Illumination Microscopy) is known as one of the methods for observing the inside of a sample having a three-dimensional structure, such as a cell. For example, in a tomographic image observation device described in Patent Literature 1, the basic principle of the SPIM is disclosed. In this device, planar light is emitted to a sample, and an image of fluorescence or scattered light generated inside the sample is formed on the image forming surface to acquire observation image data of the inside of the sample.

As another sample observation device using planar light, for example, an SPIM microscope described in Patent Literature 2 can be mentioned. In the conventional SPIM microscope, observation light from the sample is imaged by the observation optical system that emits planar light having a predetermined inclination angle to the sample arrangement surface and has an observation axis perpendicular to the emission surface of the planar light.

CITATION LIST

Patent Literature

Patent Literature 1: Japanese Unexamined Patent Publication No. S62-180241
Patent Literature 2: Japanese Unexamined Patent Publication No. 2014-202967

SUMMARY OF INVENTION

Technical Problem

In sample observation devices such as those described above, for example, a sample and a solution are held in a sample container to perform observation. Since the fluorescence from the solution is background light, it is necessary to reduce the influence of the background light in order to measure the observation light from the sample with high reproducibility. Conventionally, as a method of reducing the influence of background light from an acquired image, for example, a method can be mentioned in which the brightness value of a sample is calculated by calculating the average brightness value of a region where there is no sample from the acquired image and subtracting the average brightness value of the region where there is no sample from the brightness value of a region where there is a sample.

However, the calculation result of the brightness value of the background light may change due to various factors. For example, when the background light is fluorescence, the brightness value of the background light is expressed by the product of the fluorescence intensity per unit volume of the solution and the depth of the solution. In the case of calculating the average brightness value of a region where there is no sample in the same sample container, the height of the solution may change due to the surface tension. In addition, when a sample container holding only the solution is used to detect the background light, the dispensing accuracy of the solution may change. If the calculation result of the brightness value of the background light changes, the linearity of the brightness value of the fluorescence after background light subtraction with respect to the brightness value of the fluorescence of the sample may be greatly broken, so that the reproducibility of sample observation may be degraded.

The present disclosure has been made to solve the aforementioned problems, and it is an object of the present disclosure to provide a sample observation device and a sample observation method capable of reducing the influence of changes in the brightness value of background light.

Solution to Problem

A sample observation device according to an aspect of the present disclosure includes: an emission optical system that emits planar light to a sample on an XZ plane; a scanning unit that scans the sample in a Y-axis direction so as to pass through an emission surface of the planar light; an imaging optical system that has an observation axis inclined with respect to the emission surface and forms an image of observation light generated in the sample by emission of the planar light; an image acquisition unit that acquires a plurality of pieces of XZ image data corresponding to an optical image of the observation light formed by the imaging optical system; and an image generation unit that generates XY image data of the sample based on the plurality of pieces of XZ image data acquired by the image acquisition unit. The image acquisition unit acquires a plurality of pieces of the XZ image data in the Y-axis direction. The image generation unit extracts an analysis region in the XZ image data, integrates brightness values of at least the analysis region in a Z-axis direction to generate X image data, and combines the X image data in the Y-axis direction to generate the XY image data.

In this sample observation device, a plurality of pieces of XZ image data of the sample are acquired by the imaging optical system having an observation axis inclined with respect to the emission surface. In each piece of XZ image data, since the Z-direction component of the background light included in one pixel can be made constant, it is possible to reduce the influence of changes in the brightness value of the background light. Therefore, even in the XY image data obtained by combining the pieces of X image data in the Y-axis direction, it is possible to sufficiently reduce the influence of background light.

The image generation unit may integrate brightness values of the analysis region in the Z-axis direction after performing dark offset subtraction on at least the analysis region. By performing the dark offset subtraction, it is possible to sufficiently reduce the influence of noise in the image acquisition unit.

The image generation unit may reduce a brightness value of a region other than the analysis region and integrate brightness values of the XZ image data in the Z-axis direction to generate the X image data. Therefore, it is possible to suppress the influence of fluctuations in noise unique to an apparatus when acquiring an image.

The image generation unit may integrate brightness values of only the analysis region in the Z-axis direction to generate the X image data. Therefore, since the number of pixels integrated in the Z-axis direction can be limited, it is possible to suppress the influence of fluctuations in noise unique to an apparatus when acquiring an image.

An inclination angle of the observation axis of the imaging optical system with respect to the emission surface of the planar light may be 10° to 80°. In this range, the resolution of the observed image can be sufficiently secured.

An inclination angle of the observation axis of the imaging optical system with respect to the emission surface of the planar light may be 20° to 70°. In this range, the resolution of the observed image can be more sufficiently secured. In addition, since it is possible to suppress the change of the field of view with respect to the angle change amount of the observation axis, it is possible to secure the stability of the field of view.

An inclination angle of the observation axis of the imaging optical system with respect to the emission surface of the planar light may be 30° to 65°. In this range, the resolution of the observed image and the stability of the field of view can be more preferably secured.

The sample observation device may further include an analysis unit that analyzes observation image data including the XY image data and generates an analysis result. In this case, the analysis throughput can also be improved.

In addition, a sample observation method according to an aspect of the present disclosure includes: an emission step for emitting planar light to a sample on an XZ plane; a scanning step for scanning the sample in a Y-axis direction so as to pass through an emission surface of the planar light; an image forming step for forming an image of observation light, which is generated in the sample by emission of the planar light, using an imaging optical system having an observation axis inclined with respect to the emission surface; an image acquisition step for acquiring a plurality of pieces of XZ image data corresponding to an optical image of the observation light formed by the imaging optical system; and an image generation step for generating XY image data of the sample based on the plurality of pieces of XZ image data. In the image acquisition step, a plurality of pieces of the XZ image data are acquired in the Y-axis direction. In the image generation step, an analysis region in the XZ image data is extracted, brightness values of at least the analysis region are integrated in a Z-axis direction to generate X image data, and the X image data is combined in the Y-axis direction to generate the XY image data.

In this sample observation method, a plurality of pieces of XZ image data of the sample are acquired by the imaging optical system having an observation axis inclined with respect to the emission surface. In each piece of XZ image data, since the Z-direction component of the background light included in one pixel can be made constant, it is possible to reduce the influence of changes in the brightness value of the background light. Therefore, even in the XY image data obtained by combining the pieces of X image data in the Y-axis direction, it is possible to sufficiently reduce the influence of background light.

In the image generation step, brightness values of the analysis region may be integrated in the Z-axis direction after performing dark offset subtraction on at least the analysis region. By performing the dark offset subtraction, it is possible to sufficiently reduce the influence of noise in the image acquisition unit.

In the image generation step, a brightness value of a region other than the analysis region may be reduced and brightness values of the XZ image data may be integrated in the Z-axis direction to generate the X image data. Therefore, it is possible to suppress the influence of fluctuations in noise unique to an apparatus when acquiring an image.

In the image generation step, brightness values of only the analysis region may be integrated in the Z-axis direction to generate the X image data. Therefore, since the number of pixels integrated in the Z-axis direction can be limited, it is possible to suppress the influence of fluctuations in noise unique to an apparatus when acquiring an image.

In the image acquisition step, an inclination angle of the observation axis of the imaging optical system with respect to the emission surface of the planar light may be set to 10° to 80°. In this range, the resolution of the observed image can be sufficiently secured.

In the image acquisition step, an inclination angle of the observation axis of the imaging optical system with respect to the emission surface of the planar light may be set to 20° to 70°. In this range, the resolution of the observed image can be more sufficiently secured. In addition, since it is possible to suppress the change of the field of view with respect to the angle change amount of the observation axis, it is possible to secure the stability of the field of view.

An inclination angle of the observation axis of the imaging optical system with respect to the emission surface of the planar light may be set to 30° to 65°. In this range, the resolution of the observed image and the stability of the field of view can be more preferably ensured.

The sample observation method may further include an analysis step for analyzing the XY image data and generating an analysis result. In this case, the analysis throughput can also be improved.

Advantageous Effects of Invention

According to the sample observation device and the sample observation method, it is possible to reduce the influence of changes in the brightness value of the background light.

DESCRIPTION OF EMBODIMENTS

Hereinafter, preferred embodiments of a sample observation device and a sample observation method according to an aspect of the present disclosure will be described in detail with reference to the diagrams.

Figure 1:
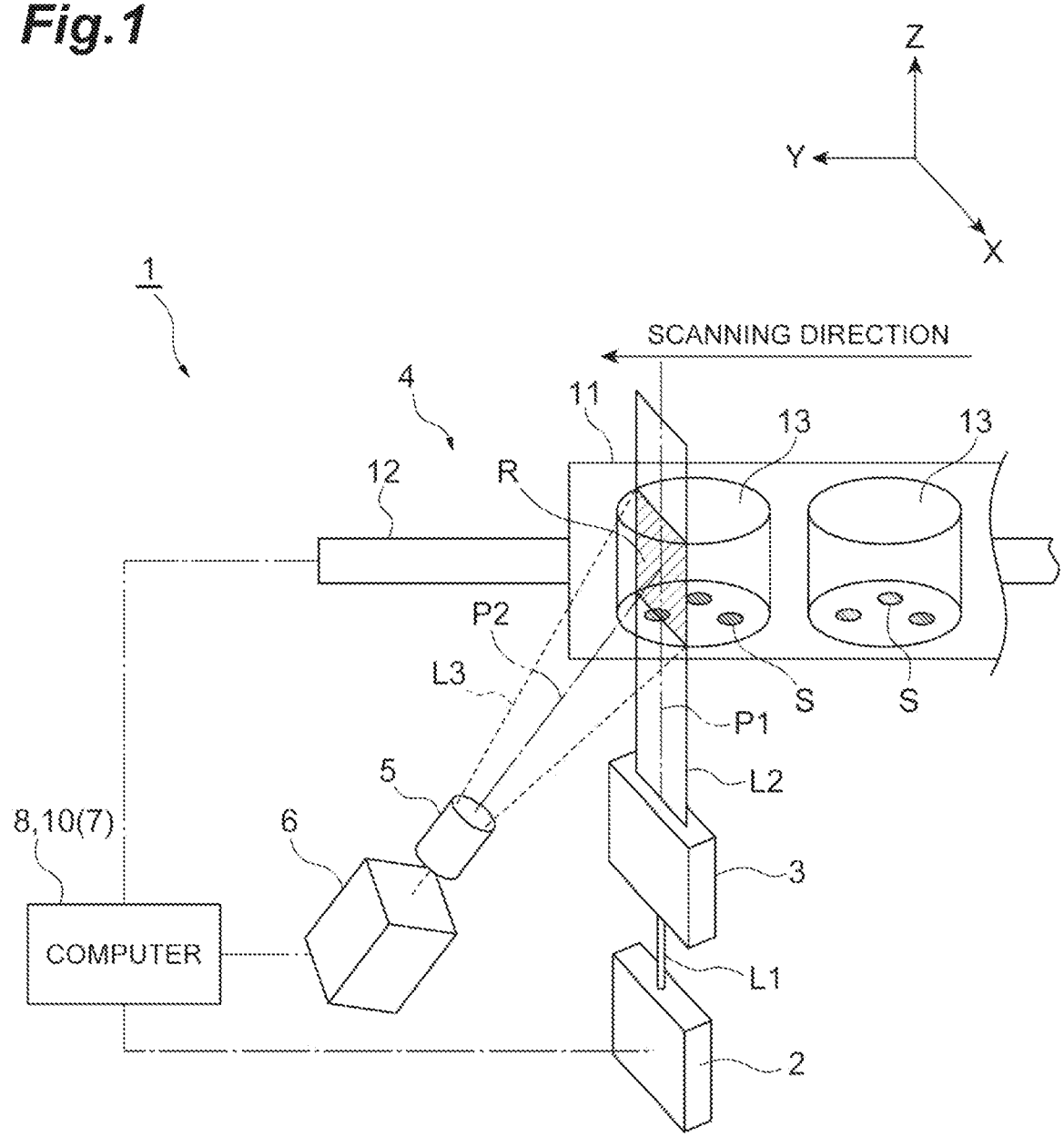
FIG. 1 is a schematic configuration diagram showing an embodiment of a sample observation device.

FIG. 1 is a schematic configuration diagram showing an embodiment of a sample observation device. This sample observation device 1 is a device that emits planar light L2 to a sample S and forms an image of observation light (for example, fluorescence, scattered light, or the like) generated inside the sample S on the image forming surface to acquire observation image data of the inside of the sample S. As this type of sample observation device 1, there are a slide scanner that acquires and displays an image of the sample S held on a slide glass, a plate reader that acquires image data of the sample S held on a microplate and analyzes the image data, and the like. As shown in FIG. 1, the sample observation device 1 is configured to include a light source 2, an emission optical system 3, a scanning unit 4, an imaging optical system 5, an image acquisition unit 6, and a computer 7.

Examples of the sample S as an observation target include human or animal cells, tissues, organs, animals or plants themselves, and plant cells and tissues. These samples S are dyed with, for example, a fluorescent material such as fluorescein-dextran (excitation wavelength: 494 nm/fluorescence wavelength: 521 nm) and tetramethylrhodamine (excitation wavelength: 555 nm/fluorescence wavelength: 580 nm). In addition, the sample S may be dyed with a plurality of fluorescent substances. The sample S may be contained in a solution, a gel, or a substance having a refractive index different from that of the sample S.

The light source 2 is a light source that outputs light L1 to be emitted to the sample S. Examples of the light source 2 include a laser light source, such as a laser diode and a solid-state laser light source. In addition, the light source 2 may be a light emitting diode, a super luminescent diode, or a lamp light source. The light L1 output from the light source 2 is guided to the emission optical system 3.

The emission optical system 3 is an optical system that shapes the light L1 output from the light source 2 into the planar light L2 and emits the shaped planar light L2 to the sample S along an optical axis P1. In the following description, the optical axis P1 of the emission optical system 3 may be referred to as the optical axis of the planar light L2. The emission optical system 3 is configured to include a light shaping element, such as a cylindrical lens, an axicon lens, or a spatial light modulator, and is optically coupled to the light source 2. The emission optical system 3 may be configured to include an objective lens. The planar light L2 formed by the emission optical system 3 is emitted to the sample S. In the sample S to which the planar light L2 is emitted, observation light L3 is generated on the emission surface R of the planar light L2. The observation light L3 is, for example, fluorescence excited by the planar light L2, scattered light of the planar light L2, or diffused reflection light of the planar light L2.

In the case of performing observation in the thickness direction of the sample S, it is preferable that the planar light L2 is thin planar light having a thickness of 2 mm or less in consideration of resolution.

In addition, when the thickness of the sample S is very small, that is, when observing the sample S having a thickness equal to or less than the Z-direction resolution described later, the thickness of the planar light L2 does not affect the resolution. Therefore, the planar light L2 having a thickness of more than 2 mm may be used.

Figure 2:
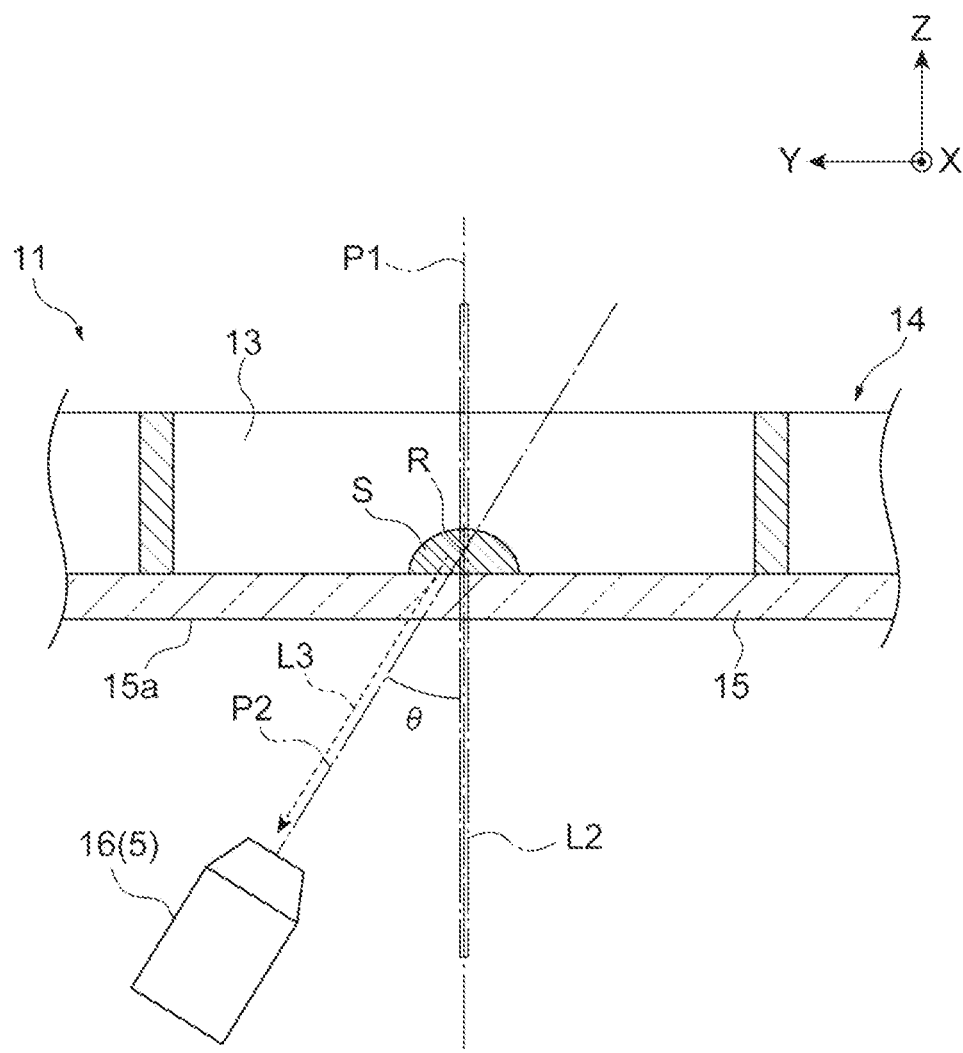
FIG. 2 is an enlarged view of a main part showing the vicinity of a sample.

The scanning unit 4 is a mechanism for scanning the sample S with respect to the emission surface R of the planar light L2. In the present embodiment, the scanning unit 4 is configured by a moving stage 12 that moves a sample container 11 holding the sample S. The sample container 11 is, for example, a microplate, a slide glass, a petri dish, or the like, and is transparent to the planar light L2 and the observation light L3. In the present embodiment, a microplate is exemplified. As shown in FIG. 2, the sample container 11 includes a plate-shaped main body 14 in which a plurality of wells 13, in which the sample S is arranged, are arranged in a straight line (or a matrix) and a plate-shaped transparent member 15 provided so as to close one end side of each of the wells 13 on one surface side of the main body 14.

When arranging the sample S in the well 13, the well 13 is filled with a solution, such as a culture solution, a fluorescent indicator, and a buffer, together with the sample S. Autofluorescence is emitted from the solution. The transparent member 15 has an input surface 15a of the planar light L2 with respect to the sample S arranged in the well 13. The material of the transparent member 15 is not particularly limited as long as this is a member transparent to the planar light L2, and is, for example, glass, quartz, or synthetic resin. The sample container 11 is arranged with respect to the moving stage 12 so that the input surface 15a is perpendicular to the optical axis P1 of the planar light L2. In addition, the other end of the well 13 is open to the outside. The sample container 11 may be fixed to the moving stage 12.

As shown in FIG. 1, the moving stage 12 scans the sample container 11 in a preset direction according to a control signal from the computer 7. In the present embodiment, the moving stage 12 scans the sample container 11 in one direction within a plane perpendicular to the optical axis P1 of the planar light L2. In the following description, the optical axis P1 direction of the planar light L2 is referred to as a Z axis, the scanning direction of the sample container 11 by the moving stage 12 is referred to as a Y axis, and a direction perpendicular to the Y axis within a plane perpendicular to the optical axis P1 of the planar light L2 is referred to as an X axis. The emission surface R of the planar light L2 with respect to the sample S is a surface within the XZ plane.

The imaging optical system 5 is an optical system that forms an image of the observation light L3 generated in the sample S by the emission of the planar light L2. As shown in FIG. 2, the imaging optical system 5 is configured to include, for example, an objective lens 16. The optical axis of the imaging optical system 5 is the observation axis P2 of the observation light L3. The observation axis P2 of the imaging optical system 5 is inclined at an inclination angle θ with respect to the emission surface R of the planar light L2 in the sample S. The inclination angle θ also matches an angle formed by the optical axis P1 of the planar light L2 toward the sample S and the observation axis P2. The inclination angle θ is 10° to 80°. From the viewpoint of improving the resolution of an observed image, it is preferable that the inclination angle θ is 20° to 70°. In addition, from the viewpoint of improving the resolution of the observed image and the stability of the field of view, it is more preferable that the inclination angle θ is 30° to 65°.

As shown in FIG. 1, the image acquisition unit 6 is a device that acquires a plurality of pieces of image data corresponding to the optical image of the observation light L3 formed by the imaging optical system 5. The image acquisition unit 6 is configured to include, for example, an imaging device that captures an optical image of the observation light L3. Examples of the imaging device include area image sensors such as a CMOS image sensor and a CCD image sensor. These area image sensors are arranged on the image forming surface of the imaging optical system 5, captures an optical image by, for example, a global shutter or a rolling shutter, and outputs data of the two-dimensional image to the computer 7.

The image acquisition unit 6 may be configured to acquire a plurality of pieces of partial image data corresponding to a part of the optical image of the observation light L3. In this case, for example, a sub-array may be set on the imaging surface of the area image sensor, and only the pixel columns included in the sub-array may be read out to acquire partial image data. Alternatively, all the pixel columns of the area image sensor may be used as the reading area, and a part of the two-dimensional image may be extracted by subsequent image processing to acquire partial image data. A line sensor may be used instead of the area image sensor, and the imaging surface itself may be limited to one pixel column to acquire partial image data. A slit that transmits only a part of the observation light L3 may be arranged on the front surface of the area image sensor, and image data of pixel columns corresponding to the slit may be acquired as partial image data.

The computer 7 is physically configured to include a memory such as a RAM and a ROM, a processor (arithmetic circuit) such as a CPU, a communication interface, a storage unit such as a hard disk, and a display unit such as a display. Examples of the computer 7 include a personal computer, a cloud server, and a smart device (a smartphone, a tablet terminal, and the like). The computer 7 functions as a controller that controls the operations of the light source 2 and the moving stage 12, an image generation unit 8 that generates observation image data of the sample S, and an analysis unit 10 that analyzes observation image data, by executing a program stored in the memory using the CPU of the computer system (refer to FIG. 1).

The computer 7 as a controller receives an input of a measurement start operation by the user, and drives the light source 2, the moving stage 12, and the image acquisition unit 6 in synchronization with each other. In this case, the computer 7 may control the light source 2 so that the light source 2 continuously outputs the light L1 while the sample S is being moved by the moving stage 12, or ON/OFF of the output of the light L1 from the light source 2 may be controlled in accordance with the image capturing by the image acquisition unit 6. In addition, when the emission optical system 3 includes an optical shutter (not shown), the computer 7 may turn ON/OFF the emission of the planar light L2 to the sample S by controlling the optical shutter.

In addition, the computer 7 as the image generation unit 8 generates observation image data of the sample S based on a plurality of pieces of image data generated by the image acquisition unit 6. For example, the image generation unit 8 generates observation image data of the sample S on a plane (XY plane) perpendicular to the optical axis P1 of the planar light L2 based on the plurality of pieces of image data output from the image acquisition unit 6. The image generation unit 8 stores the generated observation image data and displays the generated observation image data on a monitor or the like according to a predetermined operation by the user.

The computer 7 as the analysis unit 10 performs an analysis based on the observation image data generated by the image generation unit 8 and generates an analysis result. The analysis unit 10 stores the generated analysis result and displays the generated analysis result on the monitor or the like according to a predetermined operation by the user. In addition, the observation image data generated by the image generation unit 8 may not be displayed on the monitor or the like, and only the analysis result generated by the analysis unit 10 may be displayed on the monitor or the like.

Figure 3:
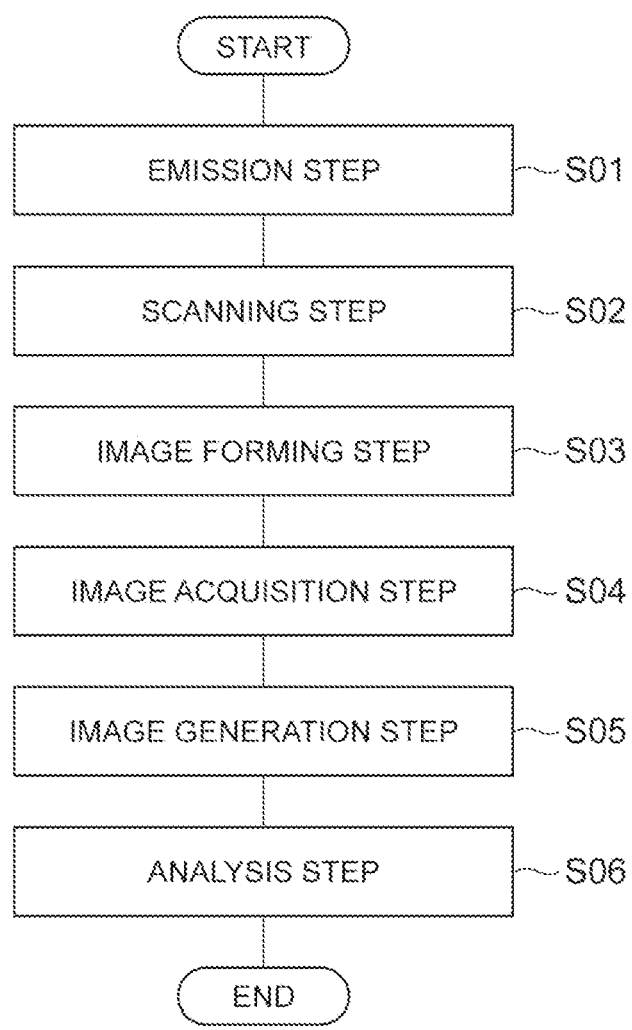
FIG. 3 is a flowchart showing an example of a sample observation method using the sample observation device.

FIG. 3 is a flowchart showing an example of a sample observation method using the sample observation device 1. As shown in the diagram, the sample observation method includes an emission step (step S01), a scanning step (step S02), an image forming step (step S03), an image acquisition step (step S04), and an image generation step (step S05), and an analysis step (step S06).

In the emission step S01, the planar light L2 is emitted to the sample S. When the user inputs a measurement start operation, the light source 2 is driven based on a control signal from the computer 7, and the light L1 is output from the light source 2. The light L1 output from the light source 2 is shaped by the emission optical system 3 to become the planar light L2, which is emitted to the sample S.

In the scanning step S02, the sample S is scanned with respect to the emission surface R of the planar light L2. When the user inputs a measurement start operation, the moving stage 12 is driven in synchronization with the driving of the light source 2 based on a control signal from the computer 7. Accordingly, the sample container 11 is linearly driven at a predetermined speed in the Y-axis direction, and the sample S in the well 13 is scanned with respect to the emission surface R of the planar light L2.

In the image forming step S03, using the imaging optical system 5 having the observation axis P2 inclined with respect to the emission surface R, an image of the observation light L3 generated in the sample S by the emission of the planar light L2 is formed on the image forming surface of the image acquisition unit 6. In the image acquisition step S04, a plurality of pieces of image data corresponding to the optical image of the observation light L3 formed by the imaging optical system 5 are acquired. The image data is sequentially output from the image acquisition unit 6 to the image generation unit 8.

Figure 4A:
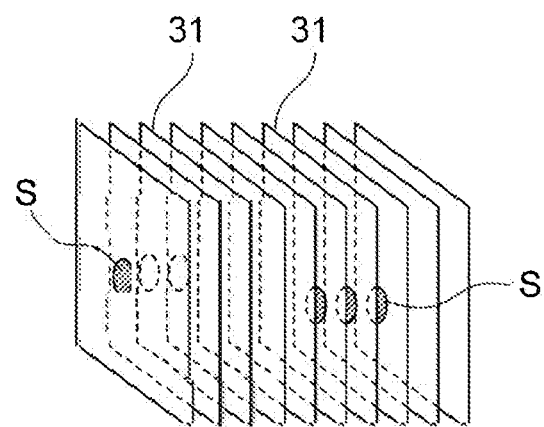
FIGS. 4A and 4B are diagrams showing an example of generating an observation image by an image generation unit.
Figure 4B:
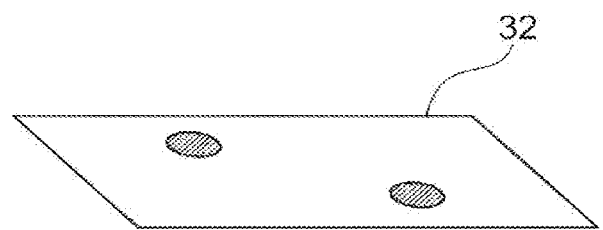

In the image generation step S05, observation image data of the sample S is generated based on the plurality of pieces of image data. In the present embodiment, as shown in FIGS. 1 and 2, the emission surface R of the planar light L2 with respect to the sample S is a surface within the XZ plane, and the emission surface R is scanned in the Y-axis direction with respect to the sample S. Therefore, as shown in FIG. 4(A), three-dimensional information of the sample S is accumulated in the image generation unit 8 by acquiring a plurality of pieces of XZ image data 31 in the Y-axis direction. In the image generation unit 8, data is reconstructed using the plurality of pieces of XZ image data 31. For example, as shown in FIG. 4B, XY image data 32 having an arbitrary thickness at an arbitrary position in the Z-axis direction in the sample S is generated as observation image data of the sample S. In addition, the image generation unit 8 may generate three-dimensional data including the XY image data 32 as observation image data.

In the analysis step S06, the analysis unit 10 analyzes the observation image data and generates an analysis result. For example, in drug discovery screening, the sample S and a reagent are put in the sample container 11, and the XY image data 32 that is the observation image data is acquired. Then, the analysis unit 10 evaluates the reagent based on the XY image data 32, and generates evaluation data as an analysis result. The analysis unit 10 may acquire three-dimensional data including the XY image data 32 as observation image data and analyze the three-dimensional data.

The sample observation device 1 described above will be described in more detail.

Figure 5A:
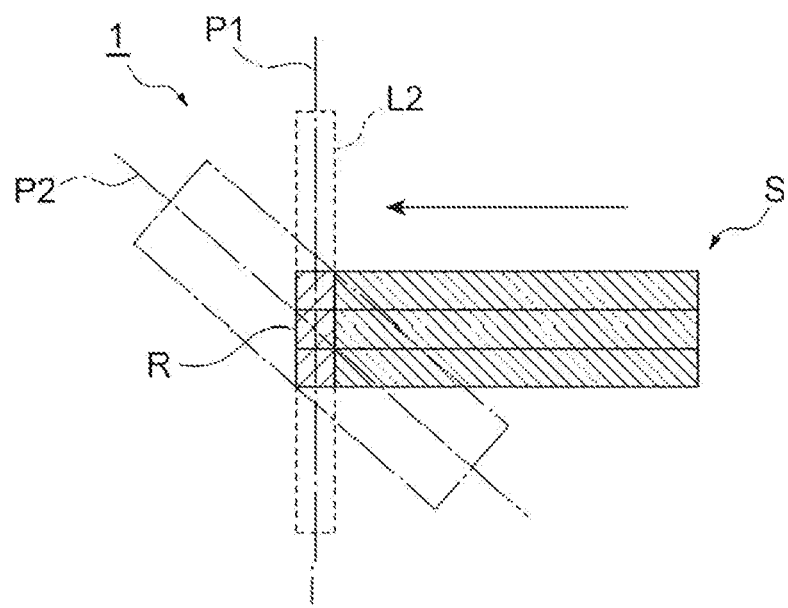
FIGS. 5A and 5B are diagrams showing how an image is acquired by an image acquisition unit.

In the sample observation device 1, as shown in FIG. 5A, the image acquisition unit 6 acquires an image while scanning the sample S with respect to the emission surface R of the planar light L2. In addition, in the sample observation device 1, the observation axis P2 of the imaging optical system 5 is inclined with respect to the emission surface R of the planar light L2. For this reason, the image acquisition unit 6 can sequentially acquire the XZ image data 31 in the optical axis P1 direction (Z-axis direction) of the planar light L2, and the image generation unit 8 can generate the XY image data 32 of the sample S based on the plurality of pieces of XZ image data 31.

Figure 5B:
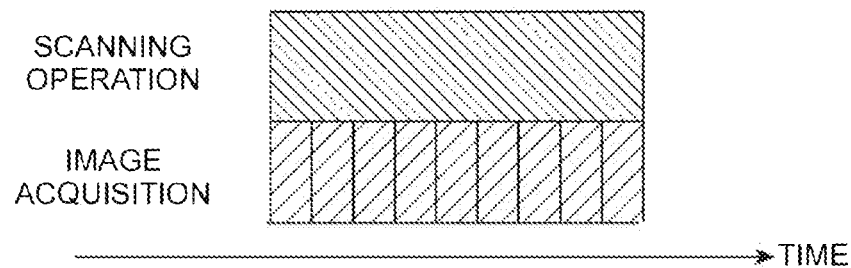

In this sample observation device 1, as shown in FIG. 5B, it is possible to sequentially acquire images while scanning the sample S. In the operation of a conventional sample observation device, a time loss occurs due to the influence of inertia and the like each time the moving stage is driven and stopped. On the other hand, in the sample observation device 1, it is possible to reduce the number of times of driving and stopping the moving stage 12 and simultaneously perform the operation of scanning the sample S and the image acquisition. Therefore, the throughput until the XY image data 32 is obtained can be improved.

In addition, in the sample observation device 1, as shown in FIG. 2, the sample S is held by the sample container 11 having the input surface 15a of the planar light L2, and the optical axis P1 of the planar light L2 by the emission optical system 3 is arranged so as to be perpendicular to the input surface 15a of the sample container 11. In addition, in the sample observation device 1, the scanning unit 4 scans the sample S in a direction (Y-axis direction) perpendicular to the optical axis P1 (Z-axis direction) of the planar light L2 by the emission optical system 3. Therefore, since image processing such as position correction of the XZ image data 31 acquired by the image acquisition unit 6 is not necessary, the processing for generating the XY image data 32 can become easy.

Figure 6:
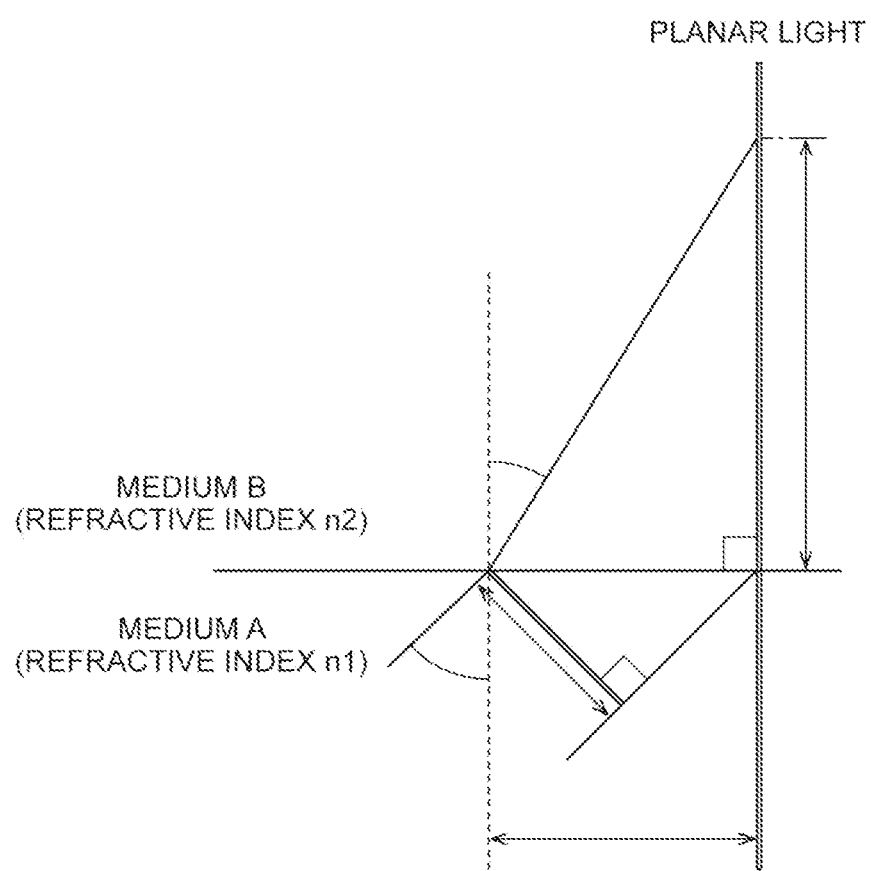
FIG. 6 is a diagram showing an example of calculating a field of view in the sample observation device.

In addition, in the sample observation device 1, the inclination angle θ of the observation axis P2 of the imaging optical system 5 with respect to the emission surface R of the planar light L2 in the sample S is 10° to 80°, preferably 20° to 70°, more preferably 30° to 65°. Hereinafter, this point will be considered. FIG. 6 is a diagram showing an example of calculating a field of view in the sample observation device. In the example shown in the diagram, the imaging optical system is located in a medium A having a refractive index n1, and the emission surface of planar light is located in a medium B having a refractive index n2. Assuming that the field of view in the imaging optical system is V, the emission surface is V', the inclination angle of the observation axis with respect to the emission surface is θ, the refraction angle at the interface between the mediums A and B is θ', and the distance at the interface between the medium A and the medium B at the inclination angle θ of the field of view V is L, the following Equations (1) to (3) are satisfied.

(Equation 1)

$$L = V/\cos\theta \quad (1)$$

(Equation 2)

$$\sin\theta' = (n1/n2) \times \sin\theta \quad (2)$$

(Equation 3)

$$V' = L/\tan\theta' \quad (3)$$

Figure 7:
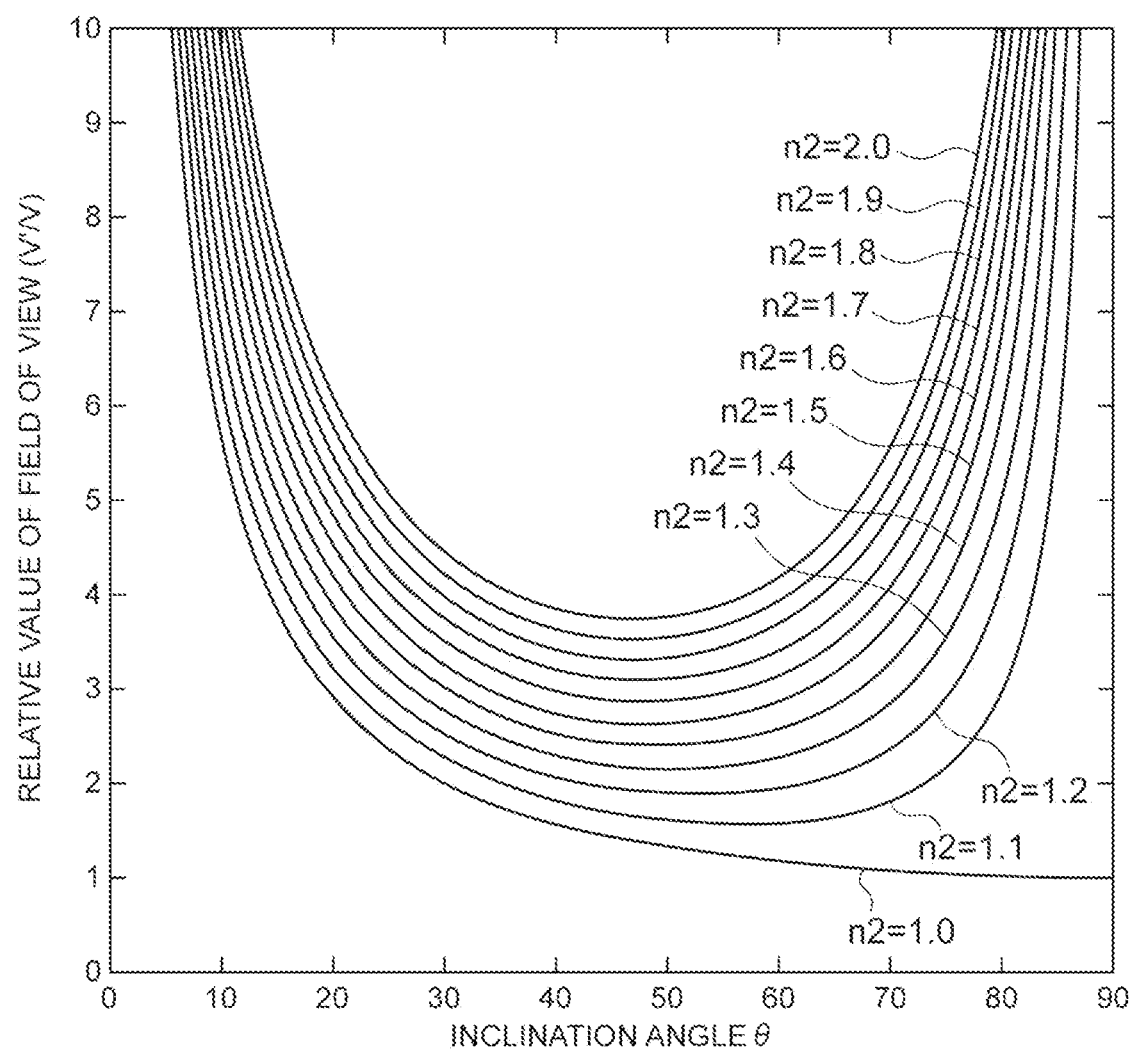
FIG. 7 is a diagram showing a relationship between the inclination angle of the observation axis and resolution.

FIG. 7 is a diagram showing a relationship between the inclination angle of the observation axis and the resolution. In the diagram, the horizontal axis is the inclination angle θ of the observation axis, and the vertical axis is the relative value V'/V of the field of view. Then, the value of V'/V when the refractive index n1 of the medium A is 1 (air) and the refractive index n2 of the medium B is changed in 0.1 increments from 1.0 to 2.0 is plotted with respect to the inclination angle θ. This indicates that the resolution in the depth direction (hereinafter referred to as "Z-direction resolution") of a sample becomes higher as the value of V'/V becomes smaller and the Z-direction resolution becomes lower as the value of V'/V becomes larger.

From the result shown in FIG. 7, it can be seen that when the refractive index n1 of the medium A and the refractive index n2 of the medium B are the same, the value of V'/V is inversely proportional to the inclination angle θ. In addition, when the refractive index n1 of the medium A and the refractive index n2 of the medium B are different, it can be seen that the value of V'/V draws a parabola with respect to the inclination angle θ. From this result, it can be seen that the Z-direction resolution can be controlled by the refractive index of the arrangement space of the sample, the refractive index of the arrangement space of the imaging optical system, and the inclination angle θ of the observation axis. In addition, it can be seen that in the range of the inclination angle θ of 10° to 80°, a better Z-direction resolution than in the range of the inclination angle θ less than 10° and larger than 80° can be obtained.

In addition, from the result shown in FIG. 7, it can be seen that the inclination angle θ at which the Z-direction resolution is a maximum tends to decrease as the difference between the refractive index n1 and the refractive index n2 increases. When the refractive index n2 is in the range of 1.1 to 2.0, the inclination angle θ at which the Z-direction resolution is a maximum is in the range of about 47° to about 57°. For example, when the refractive index n2 is 1.33 (water), the inclination angle θ at which the Z-direction resolution is a maximum is estimated to be about 52°. In addition, for example, when the refractive index n2 is 1.53 (glass), the inclination angle θ at which the Z-direction resolution is a maximum is estimated to be about 48°.

Figure 8:
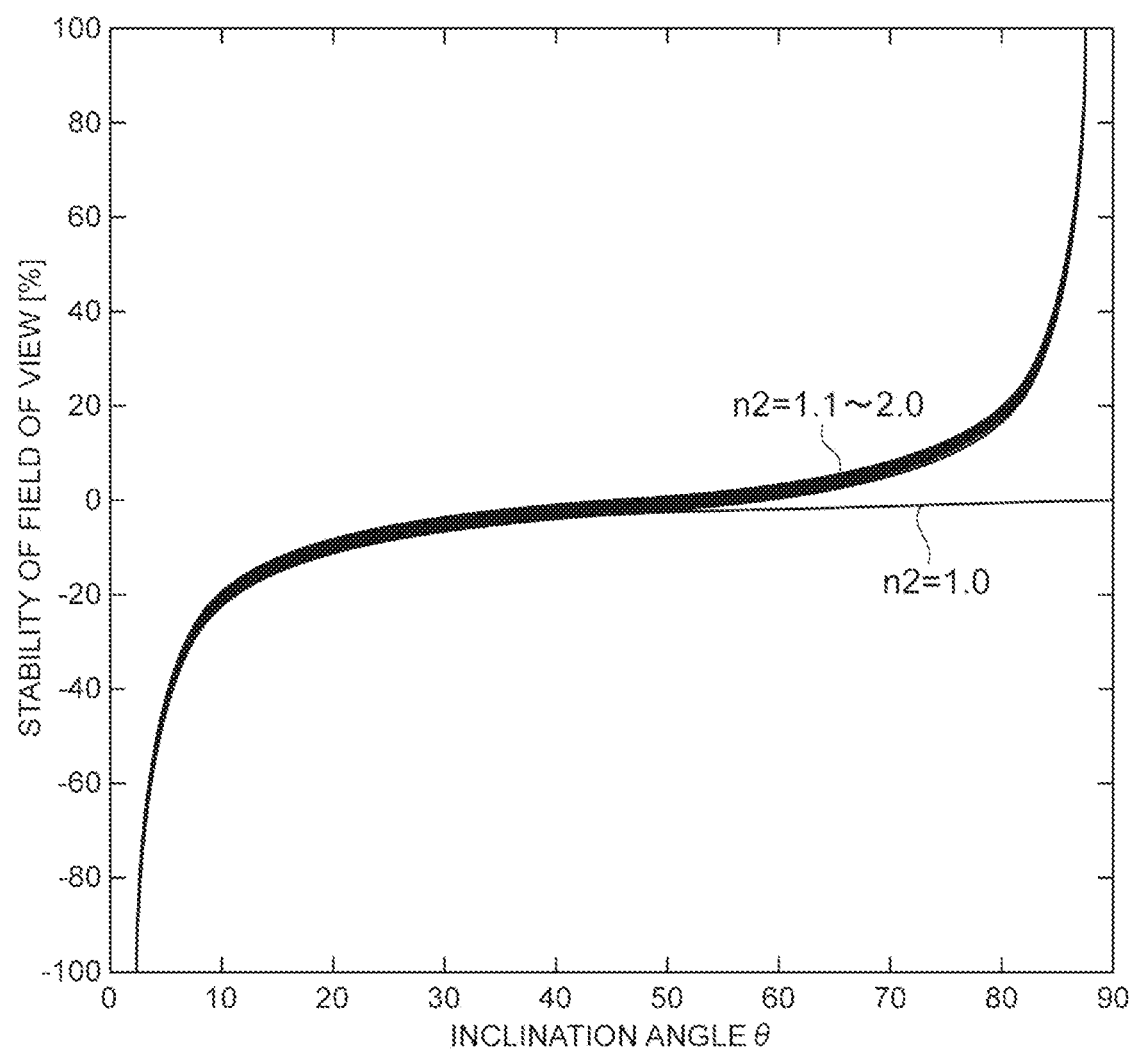
FIG. 8 is a diagram showing a relationship between the inclination angle of the observation axis and the stability of the field of view.

FIG. 8 is a diagram showing a relationship between the inclination angle of the observation axis and the stability of the field of view. In the diagram, the horizontal axis is the inclination angle θ of the observation axis, and the vertical axis is the stability of the field of view. The stability is expressed by the ratio of a difference value between V'/V at the inclination angle θ+1 and V'/V at the inclination angle θ−1 to V'/V at the inclination angle θ, and is calculated based on the following Equation (4). The closer the stability is to 0%, the smaller the change in the field of view with respect to the change in the inclination angle, and it can be evaluated that the field of view is stable. Similar to FIG. 7, in FIG. 8, the stability when the refractive index n1 of the medium A is 1 (air) and the refractive index n2 of the medium B is changed in 0.1 increments from 1.0 to 2.0 is plotted.

(Equation 4)

$$\text{Stability (\%)} = ((V'/V)_{\theta+1} - (V'/V)_{\theta-1})/(V'/V)_\theta \quad (4)$$

From the result shown in FIG. 8, it can be seen that in a range where the inclination angle θ is less than 10° and exceeds 80°, the stability exceeds ±20% and it is difficult to control the field of view. On the other hand, when the inclination angle θ is in the range of 10° to 80°, the stability is ±20% or less, and the field of view can be controlled. In addition, when the inclination angle θ is in the range of 20° to 70°, the stability is ±10% or less, and it becomes easy to control the field of view.

Figure 9:
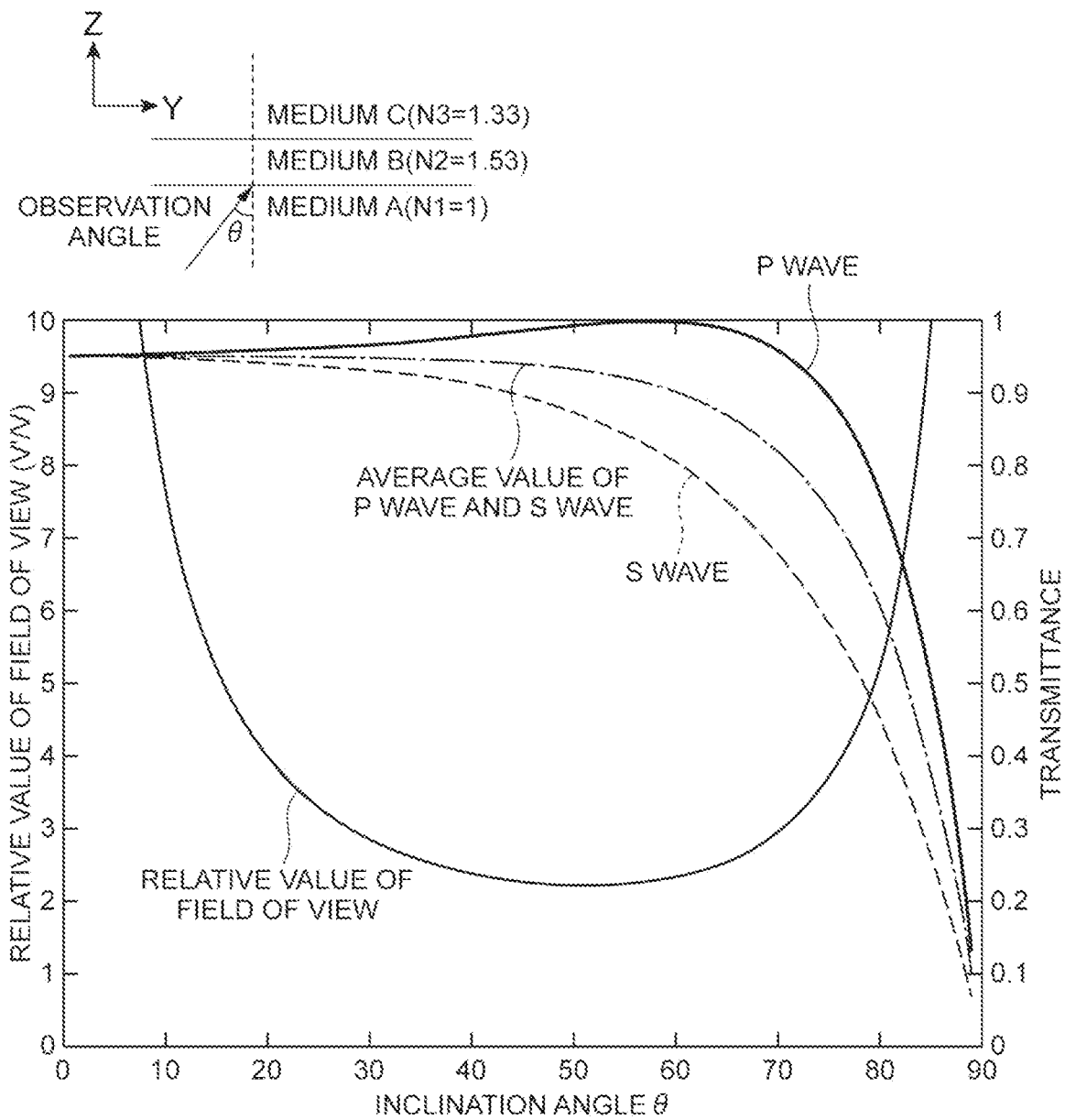
FIG. 9 is a diagram showing a relationship between the inclination angle of the observation axis and the transmittance of observation light from a sample.

FIG. 9 is a diagram showing a relationship between the inclination angle of the observation axis and the transmittance of observation light from a sample. In the diagram, the horizontal axis is the inclination angle θ of the observation axis, the vertical axis on the left side is the relative value of the field of view, and the vertical axis on the right side is the transmittance. In FIG. 9, in consideration of the sample holding state in the sample container, assuming that the refractive index n1 of the medium A is 1 (air), the refractive index n2 of the medium B is 1.53 (glass), and the refractive index n3 of the medium C is 1.33 (water), the transmittance value is a product of the transmittance of the interface between the mediums B and C and the transmittance of the interface between the mediums A and B. In FIG. 9, the P wave transmittance, the S wave transmittance, and the angle dependence of their average value are plotted. In addition, in FIG. 9, the relative value of the field of view in the medium C is also plotted.

From the result shown in FIG. 9, it can be seen that the transmittance of the observation light from the sample to the imaging optical system can be changed by changing the inclination angle θ of the observation axis. It can be seen that the transmittance of at least 50% or more is obtained when the inclination angle θ is in the range of 80° or less. In addition, it can be seen that the transmittance of at least 60% or more is obtained when the inclination angle θ is in the range of 70° or less and the transmittance of at least 75% or more is obtained when the inclination angle θ is in the range of 65° or less.

From the above results, when the Z-direction resolution of the sample is required, for example, it is preferable to select the inclination angle θ from the range of 30° to 65° so that the value of V'/V that is the relative value of the field of view is 3 or less, the stability is less than 5%, and the transmittance of the observation light (the average value of the P wave and the S wave) is 75% or more. In addition, when the Z-direction resolution of the sample is not required, the inclination angle θ may be appropriately selected from the range of 10° to 80°. From the viewpoint of securing the range of the field of view per pixel, it is preferable to select the inclination angle θ from the range of 10° to 30° or 65° to 80°.

Subsequently, background light subtraction processing in the sample observation device 1 will be described.

In the sample observation device 1, the sample S and the fluorescent solution are held in the well 13 of the sample container 11 for observation. Since the autofluorescence from the solution becomes background light, it is necessary to reduce the influence of background light in order to measure the observation light L3 from the sample S with high reproducibility. Conventionally, as a method of reducing the influence of background light from an acquired image, for example, a method can be mentioned in which the brightness value of a sample is calculated by calculating the average brightness value of a region where there is no sample from the acquired image and subtracting the average brightness value of the region where there is no sample from the brightness value of a region where there is a sample.

However, the calculation result of the brightness value of the background light may change due to various factors. For example, when the background light is fluorescence, the brightness value of the background light is expressed by the product of the fluorescence intensity per unit volume of the solution and the depth of the solution. In the case of calculating the average brightness value of a region where there is no sample in the same sample container, the height of the solution may change due to the surface tension. In addition, when a sample container holding only the solution is used to detect the background light, the dispensing accuracy of the solution may change.

Figure 10:
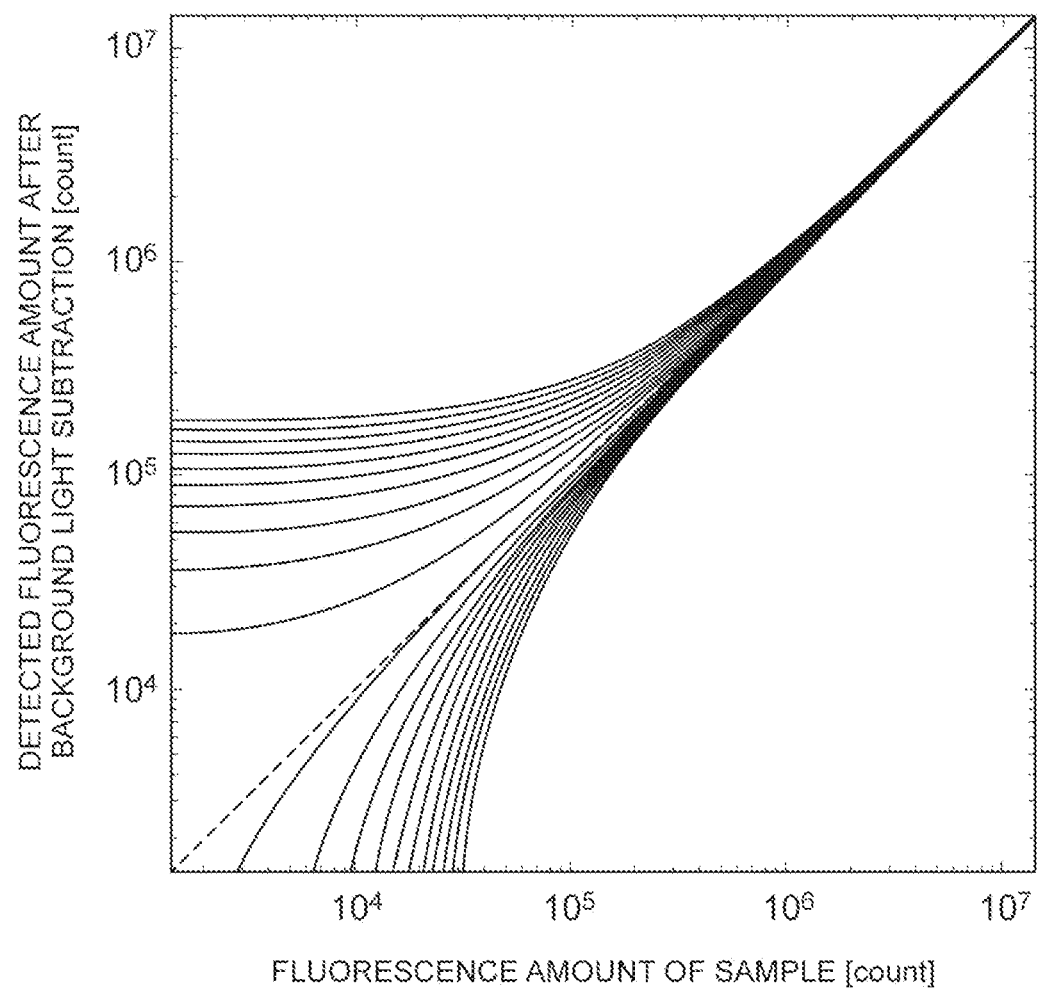
FIG. 10 is a diagram showing the influence of changes in the subtraction value of background light.

If the calculation result of the brightness value of the background light changes, for example, as shown in FIG. 10, the linearity of the brightness value of the fluorescence after background light subtraction with respect to the brightness value of the fluorescence of the sample may be greatly broken, so that the reproducibility of sample observation may be degraded. FIG. 10 shows a fluorescence amount after background light subtraction with respect to the fluorescence amount of a sample when the background light subtraction value changes by ±10%. From this result, it can be seen that the linearity of the brightness value of the fluorescence after background light subtraction is not maintained even if the subtraction value of the background light changes by ±several %.

Figure 11:
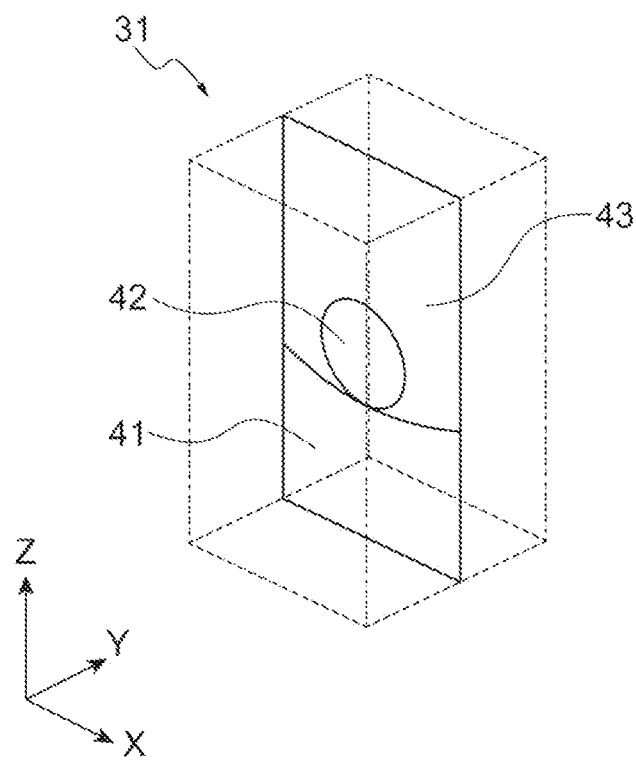
FIG. 11 is a diagram showing an example of generating XZ image data.

On the other hand, the image generation unit 8 of the sample observation device 1 first extracts an analysis region F in the XZ image data 31. The extraction of the analysis region F is performed for a region where fluorescence from the sample S is present among the regions imaged by the XZ image data 31. In the example shown in FIG. 11, one piece of XZ image data 31, among the plurality of pieces of XZ image data 31 that are plural in the Y-axis direction in the image acquisition unit 6, is shown. The XZ image data 31 includes, for example, an optical image 41 corresponding to the transparent member 15 of the sample container 11 or the air, an optical image 42 corresponding to the sample S, and an optical image 43 corresponding to the solution.

Figure 12:
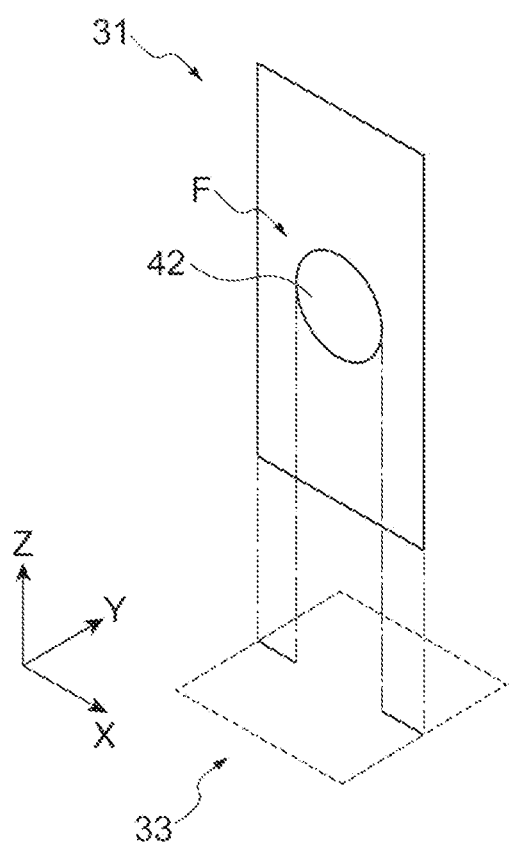
FIG. 12 is a diagram showing an example of generating X image data.
Figure 13:
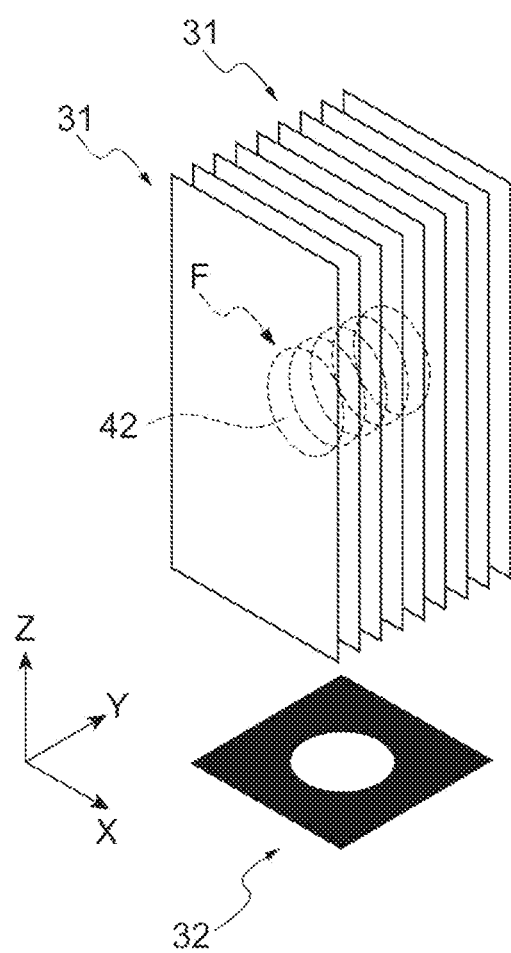
FIG. 13 is a diagram showing an example of generating XY image data.

As shown in FIG. 12, the image generation unit 8 extracts an analysis region F in the XZ image data 31 and integrates the brightness values of the analysis region F in the Z-axis direction to generate X image data 33. Similarly for the other pieces of XZ image data 31, the image generation unit 8 extracts the analysis region F and integrates the brightness values of the analysis region F in the Z-axis direction to generate a plurality of pieces of X image data 33. As shown in FIG. 13, the image generation unit 8 combines these pieces of X image data 33 in the Y-axis direction to generate the XY image data 32.

Figure 14:
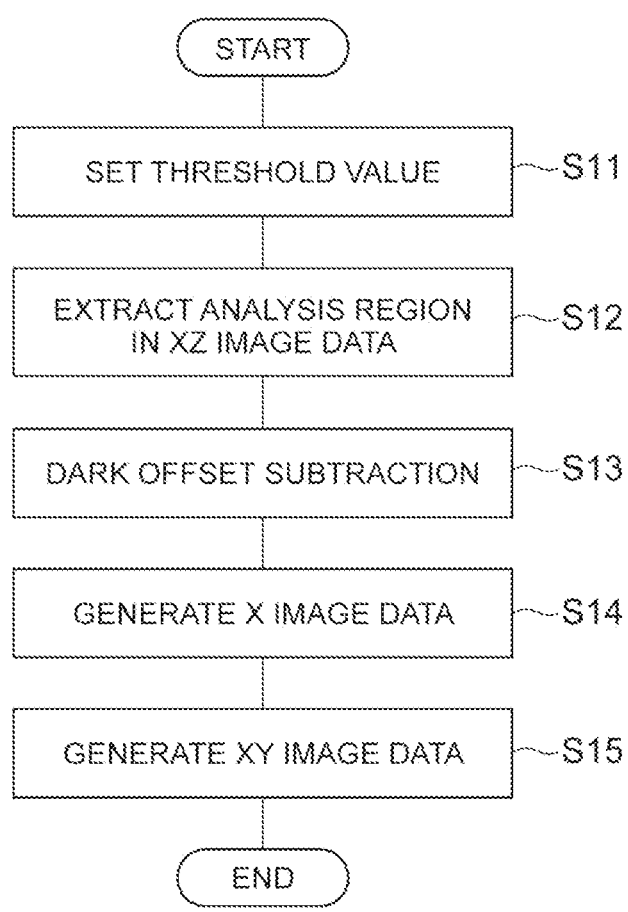
FIG. 14 is a flowchart showing an example of an image generation step.

FIG. 14 is a flowchart showing an example of the image generation step S05. In the example of the image generation step S05 shown in the diagram, first, a threshold value for extracting the analysis region F is set (step S11). The threshold value is set, for example, based on the brightness value of the XZ image data 31 for the well 13 of the sample container 11 holding only the solution. When the fluorescence amount of the sample S is known, the threshold value may be set based on the fluorescence amount. The threshold value may be set for each piece of XZ image data 31, or may be set for each pixel of the image acquisition unit 6.

Then, extraction of the analysis region F in the XZ image data 31 is performed based on the set threshold value (step S12). Here, a region where fluorescence from the sample S is present is extracted as the analysis region F. After the analysis region F is extracted, dark offset subtraction of the image acquisition unit 6 is performed on the analysis region F (step S13). The dark offset is noise unique to an imaging apparatus, and is noise generated by dark current of the imaging apparatus, for example. After performing the dark offset subtraction, the brightness values of the analysis region F are integrated in the Z-axis direction to generate the X image data 33 (step S14). Then, pieces of the X image data 33 similarly obtained for the other pieces of XZ image data 31 are combined in the Y-axis direction to generate the XY image data 32 (step S15). In addition, the dark offset subtraction in step S13 may be performed before the threshold value setting in step S11. In this case, it is preferable to set the threshold value in consideration of the dark offset subtraction. The dark offset subtraction in step S13 may be performed after the generation of the X image data 33 in step S14. At this time, since the dark offset subtraction is performed on the X image data 33, the same effect as when performing the dark offset subtraction on the entire XZ image data 31 is obtained.

In addition, in the image generation step S05, the X image data 33 may be generated in step S14 after reducing the brightness values of a plurality of pixels forming a region other than the analysis region F. For example, after performing processing for setting the brightness value of a plurality of pixels forming the region other than the analysis region F to 0 count, the XZ image data 31 may be integrated in the Z-axis direction to generate the X image data 33. In this case, it is possible to suppress the influence of fluctuations in noise (for example, read noise) unique to the imaging apparatus. Such processing is also effective when background light is not generated (for example, when the solution does not generate autofluorescence).

In addition, in the image generation step S05, after the analysis region F is extracted in step S12, only the analysis region F in the XZ image data 31 may be integrated in the Z-axis direction to generate the X image data 33. In this case, since the number of pixels integrated in the generation of the X image data 33 is limited, it is possible to suppress the influence of fluctuations in noise (for example, read noise) unique to the imaging apparatus. Such processing is also effective when background light is not generated (for example, when the solution does not generate autofluorescence).

Figure 15:
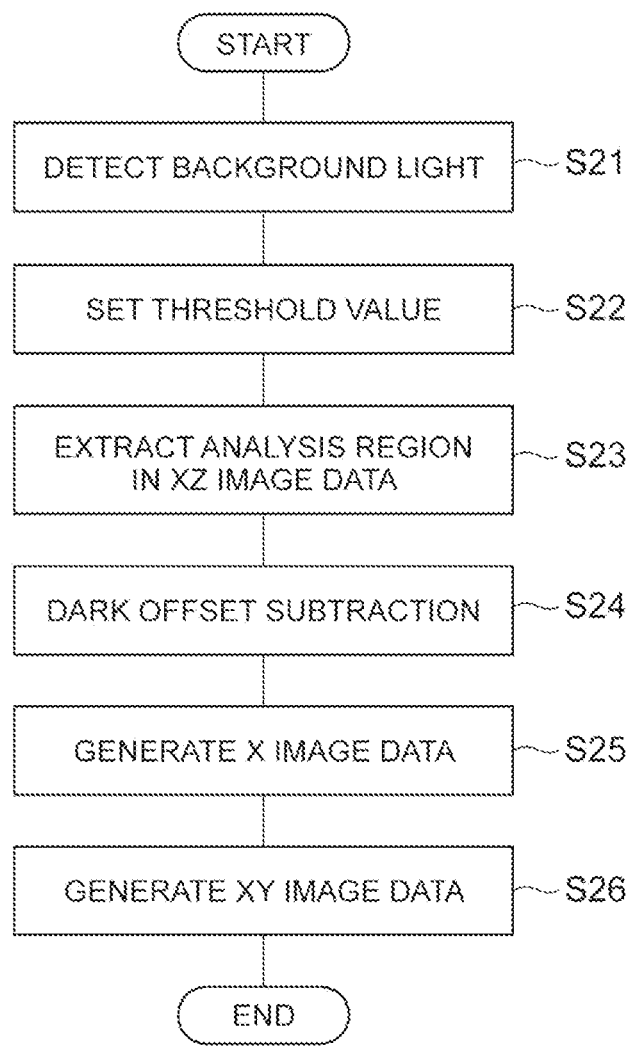
FIG. 15 is a flowchart showing another example of the image generation step.

FIG. 15 is a flowchart showing another example of the image generation step S05. This another example is different from the form shown in FIG. 14 in that a threshold value is set in the XZ image data 31. In the example of the image generation step S05, first, background light in the XZ image data 31 is detected (step S21). Here, the brightness value of the background light is calculated from the brightness value of a region where the sample S is not present in the XZ image data 31. In addition, examples of the region where the sample S is not present include a region of the optical image 41 corresponding to the transparent member 15 of the sample container 11 or the air and a region of the optical image 43 corresponding to the solution.

Various methods can be applied to specify a region where the sample S is not present. For example, the region where the sample S is not present may be the upper region of the XZ image data 31. In addition, when the thickness of the sample S is known, the region where the sample S is not present may be in the range from the transparent member 15 to the thickness of the sample S or more. In addition, when the fluorescence amount of the sample S is known, the region where the sample S is not present may be a region formed by pixels having brightness values equal to or less than a threshold value that is equal to or less than the fluorescence amount.

In addition, various methods can be applied to the acquisition of the brightness value of the background light. For example, the brightness value of the background light may be calculated from the brightness value of a specific pixel in a region where the sample S is not present, or may be calculated from the brightness value distribution of a plurality of pixels in the X direction or the Z direction of a region where the sample S is not present. In addition, the brightness value of the background light may be calculated from the brightness value distribution of a plurality of pixels forming a specific area of the region where the sample S is not present.

Then, a threshold value for extracting the analysis region F is set based on the detected background light (step S22). In addition, as in the case of FIG. 14, extraction of the analysis region F in the XZ image data 31 (step S23), dark offset subtraction (step S24), generation of the X image data 33 (step S25), and generation of the XY image data 32 (step S26) are performed. The dark offset subtraction in step S24 may be performed before the background light detection in step S21. In this case, it is preferable to detect the background light and set the threshold value in consideration of the dark offset subtraction. The dark offset subtraction in step S24 may be performed after the generation of the X image data 33 in step S25. At this time, since the dark offset subtraction is performed on the X image data 33, the same effect as when performing the dark offset subtraction on the entire XZ image data 31 is obtained.

Figure 16:
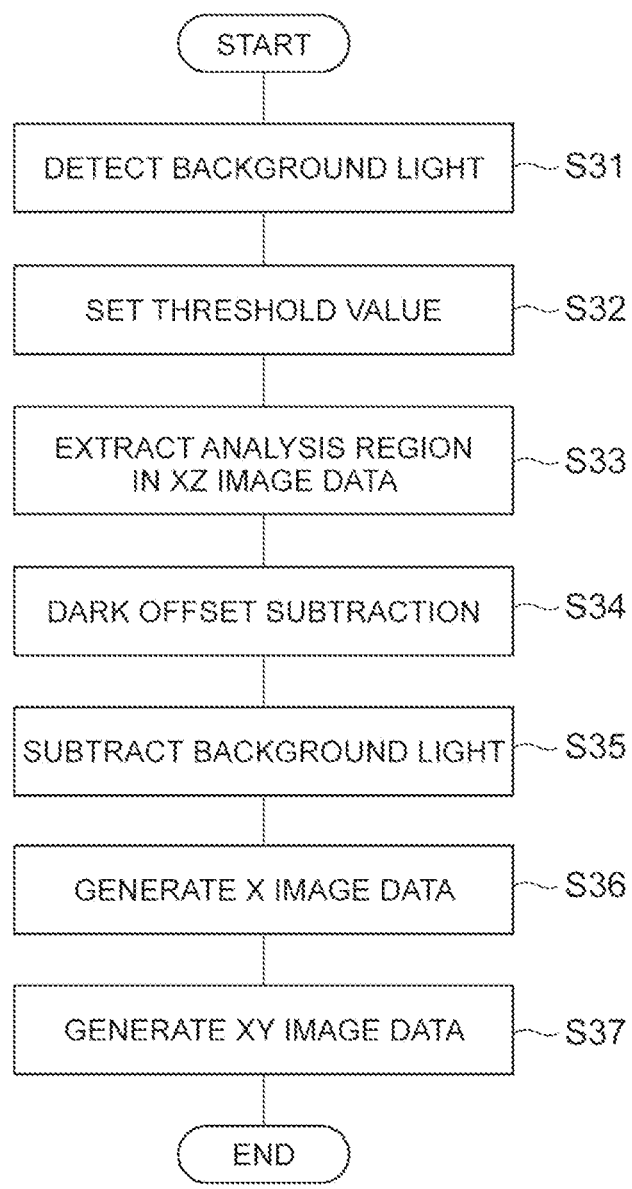
FIG. 16 is a flowchart showing still another example of the image generation step.

FIG. 16 is a flowchart showing still another example of the image generation step S05. This still another example is different from the form shown in FIG. 14 in that background light subtraction is performed after the extraction of the analysis region F. In the example of the image generation step S05, first, as in the case of FIG. 15, background light in the XZ image data 31 is detected (step S31), and a threshold value for extracting the analysis region F is set based on the detected background light (step S32). Then, the analysis region F in the XZ image data 31 is extracted (step S33), and dark offset subtraction is performed (step S34).

After performing the dark offset subtraction, the background light is subtracted from the analysis region F (step S35). In step S35, for example, the brightness value of the background light detected in step S31 is subtracted for each pixel corresponding to the analysis region F. The brightness value of the background light used for the subtraction may be the brightness value of the background light calculated in step S31, or may be the brightness value of the background light calculated by another method.

After subtraction of the background light, generation of the X image data 33 (step S36) and generation of the XY image data 32 (step S37) are performed. The dark offset subtraction in step S34 may be performed before the background light detection in step S31. In this case, it is preferable to detect the background light, set the threshold value, and subtract the background light in consideration of the dark offset subtraction. In addition, the subtraction of the background light in step S35 may be performed before the setting of the threshold value in step S32. In this case, it is preferable to detect the background light in consideration of the amount of dark offset subtraction and to set the threshold value in consideration of the amount of dark offset subtraction and the amount of background light subtraction. The dark offset subtraction in step S34 and the background light subtraction in step S35 may be performed after the generation of the X image data 33 in step S36. At this time, since the dark offset subtraction is performed on the X image data 33, the same effect as when performing the dark offset subtraction on the entire XZ image data 31 is obtained.

Figure 17:
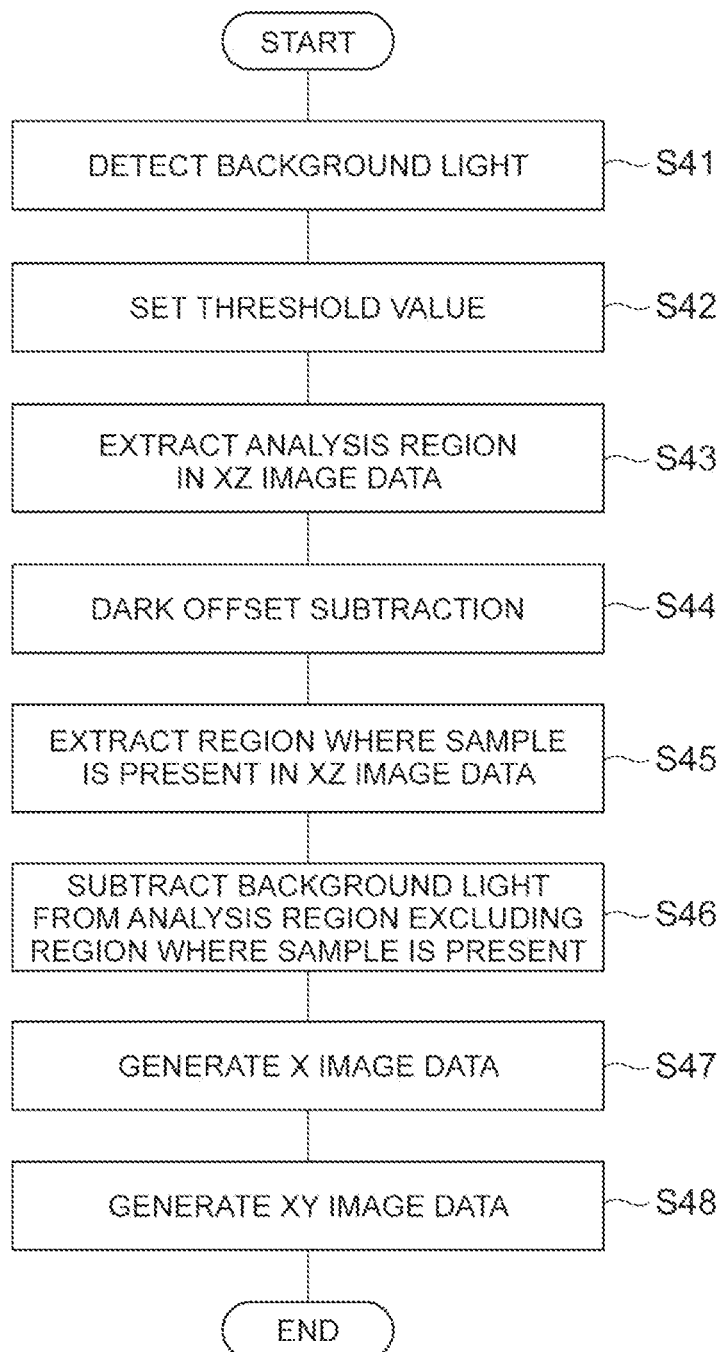
FIG. 17 is a flowchart showing still another example of the image generation step.

FIG. 17 is a flowchart showing still another example of the image generation step S05. This still another example is different from the form shown in FIG. 14 in that a region where the sample S is present is further extracted from the analysis region F and background light is subtracted from a region excluding the region where the sample S is present. In the example of the image generation step S05, first, as in the case of FIG. 15, detection of background light in the XZ image data 31 (step S41), setting of a threshold value (step S42), and extraction of the analysis region F in the XZ image data 31 (step S43), and dark offset subtraction (step S44) are performed.

Then, a region where the sample S is present is extracted from the analysis region F (step S45). The region where the sample S is present may be extracted by edge detection of the sample S based on the brightness value of each pixel in the XZ image data 31, or may be extracted based on the brightness profile of the sample S. When the fluorescence amount of the sample S is known, the region where the sample S is present may be extracted based on the threshold value set based on the fluorescence amount. After the region where the sample S is present is extracted, the background light is subtracted from the analysis region F excluding the region where the sample S is present (step S46). The brightness value of the background light used for the subtraction may be the brightness value of the background light calculated in step S41, or may be the brightness value of the background light calculated by another method. After subtraction of the background light, generation of the X image data 33 (step S47) and generation of the XY image data 32 (step S48) are performed. Normally, there is no solution inside the sample S, but the fluorescence from the sample S is spread around the sample S by the optical system. Since the solution is present around the sample S, the accuracy of the observed image can be improved by subtracting the background light from pixels from which an optical image around the sample S is acquired.

The dark offset subtraction in step S44 may be performed between the extraction of the region where the sample S is present in step S45 and the background light subtraction in step S46. In this case, it is preferable that a region where the dark offset subtraction is performed is the entire analysis region F. In addition, the dark offset subtraction in step S44 may be performed before the background light detection in step S41. In this case, it is preferable to detect the background light, set the threshold value, and subtract the background light in consideration of the dark offset subtraction.

The dark offset subtraction in step S44 and the background light subtraction in step S46 may be performed after the generation of the X image data 33 in step S47. In this case, it is thought that the background light is present in pixels excluding pixels corresponding to the region where the sample S is present from pixels to be integrated in the Z-axis direction. Therefore, it is preferable that the background light subtraction is performed on pixels excluding the pixels corresponding to the region where the sample S is present from the pixels corresponding to the analysis region F of the XZ image data 31.

In addition, the dark offset subtraction in step S44 and the background light subtraction similar to step S35 may be performed between the background light detection in step S41 and the threshold value setting in step S42. In this case, the background light is excessively subtracted from the region where the sample S is present. Therefore, instead of performing the background light subtraction in step S46, it is preferable to perform processing for adding the excessive subtraction amount after the generation of the X image data 33 in step S47.

As described above, in the sample observation device 1, a plurality of pieces of XZ image data 31 of the sample S are acquired by the imaging optical system 5 having the observation axis P2 that is inclined with respect to the emission surface R. In each piece of XZ image data 31, since the Z-direction component of the background light included in one pixel can be made constant, it is possible to reduce the influence of changes in the brightness value of the background light. In addition, by extracting the analysis region F in the XZ image data 31, the sample S and the background can be separated. For this reason, in the X image data 33 obtained by integrating the brightness value of the analysis region F in the Z-axis direction, the influence of background light is sufficiently reduced. Therefore, even in the XY image data 32 obtained by combining the pieces of X image data 33 in the Y-axis direction, it is possible to sufficiently reduce the influence of background light, so that it is possible to improve the reproducibility of sample observation.

In addition, in the sample observation device 1, the image generation unit 8 integrates the brightness values of the analysis region F in the Z-axis direction after performing the dark offset subtraction on the analysis region F. By performing the dark offset subtraction, it is possible to sufficiently reduce the influence of noise in the image acquisition unit 6. Therefore, the reproducibility of sample observation can be further improved.

In addition, in the sample observation device 1, the image generation unit 8 can reduce the brightness value of a region other than the analysis region F and integrate the brightness values of the XZ image data 31 in the Z-axis direction to generate the X image data 33. As a result, it is possible to suppress the influence of fluctuations in noise unique to the imaging apparatus. In the sample observation device 1, the image generation unit 8 can generate the X image data 33 by integrating the brightness values of only the analysis region F in the Z-axis direction. Also in this case, since the number of pixels integrated in the Z-axis direction can be limited, it is possible to suppress the influence of fluctuations in noise unique to the imaging apparatus.

In addition, in the sample observation device 1, the inclination angle θ of the observation axis P2 of the imaging optical system 5 with respect to the emission surface R of the planar light L2 is 10° to 80°, preferably 20° to 70°, more preferably 30° to 65°. According to this range, the stability of the field of view with respect to the resolution of the observation image and the amount of change in the angle of the observation axis can be sufficiently secured. In addition, the sample observation device 1 includes the analysis unit 10 that analyzes the XY image data 32 and generates an analysis result. Therefore, the analysis throughput can also be improved.

The present disclosure is not limited to the above-described embodiment. For example, the optical axis P1 of the planar light L2 and the input surface 15a of the sample container 11 do not necessarily need to be perpendicular to each other, and the optical axis P1 of the planar light L2 and the scanning direction of the sample S by the scanning unit 4 do not necessarily need to be perpendicular to each other.

In addition, for example, in the above-described embodiment, the transparent member 15 is provided in the sample container 11 so as to close one end side of the well 13, and the planar light L2 is input from the input surface 15a of the transparent member 15. However, the planar light L2 may be input from the other end side of the well 13. In this case, since the number of interfaces between mediums having different refractive indices is reduced, it is possible to reduce the number of refraction times of the observation light L3. In addition, the sample S may be held on a solid substance, such as gel, instead of the sample container 11, or the sample S may be moved by flowing a fluid, such as water, into the transparent container as in a flow cytometer.

In addition, a plurality of pairs of the imaging optical system 5 and the image acquisition unit 6 may be arranged. In this case, the observation range can be expanded, and observation light components L3 having a plurality of different wavelengths can be observed. In addition, a plurality of image acquisition units 6 may be arranged with respect to the imaging optical system 5, or the image acquisition unit 6 may be arranged with respect to a plurality of imaging optical systems 5. The plurality of image acquisition units 6 may be a combination of different types of photodetectors or imaging apparatuses. The light source 2 may be configured by a plurality of light sources that output light components having different wavelengths. In this case, excitation light components having different wavelengths can be emitted to the sample S.

In addition, in order to reduce astigmatism, a prism may be arranged in the imaging optical system 5. In this case, for example, a prism may be arranged on the rear side of the objective lens 16 (between the objective lens 16 and the image acquisition unit 6). As a measure against defocus, the imaging surface of the imaging apparatus in the image acquisition unit 6 may be inclined with respect to the observation axis P2. In addition to this, for example, a dichroic mirror or a prism may be arranged between the imaging optical system 5 and the image acquisition unit 6 for wavelength separation of the observation light L3.

REFERENCE SIGNS LIST

1: sample observation device, 3: emission optical system, 4: scanning unit, 5: imaging optical system, 6: image acquisition unit, 8: image generation unit, 10: analysis unit, 31: XZ image data, 32: XY image data, 33: X image data, L2: planar light, L3: observation light, P2: observation axis, R: emission surface, S: sample, F: analysis region, θ: inclination angle.

The invention claimed is:

1. A device, comprising:
an image scanner configured to acquire a plurality of pieces of XZ images of a sample in a Y-axis direction; and
a computer including a memory and a processor, the computer configured to generate an XY image of the sample based on the plurality of pieces of the XZ images acquired by the scanner,
wherein the computer is configured to integrate brightness values of a plurality of pixels of each of XZ images in the Z-axis direction to generate an X image, and to combine the X image in the Y-axis direction to generate the XY image,
wherein the computer is configured to set an analysis region in each of the XZ images of a plurality of pieces of XZ images, and
wherein the computer is configured to perform processing dark offset subtraction on at least the analysis region before the XZ images are integrated in the Z-axis direction to generate the X image.

2. The device according to claim 1,
wherein the computer is configured to set an analysis region in each of the XZ images of a plurality of pieces of XZ images, and
wherein the computer is configured to perform processing background light subtraction on at least the analysis region before the XZ images are integrated in the Z-axis direction to generate the X image.

3. A method, comprising:
acquiring a plurality of pieces of XZ images of a sample in a Y-axis direction;
integrating brightness values of a plurality of pixels of each of XZ images in the Z-axis direction to generate an X image;
combining a plurality of the X image in the Y-axis direction to generate an XY image of the sample;
setting an analysis region in each of the XZ images of a plurality of pieces of XZ images; and
processing dark offset subtraction on at least the analysis region before the integrating.

4. The method according to claim 3, further comprising:
setting an analysis region in each of the XZ images of a plurality of pieces of XZ images, and
processing background light subtraction on at least the analysis region before the integrating.

5. A device, comprising:
an image scanner configured to acquire a plurality of pieces of XZ images of a sample in a Y-axis direction; and
a computer including a memory and a processor, the computer configured to generate an XY image of the sample based on the plurality of pieces of the XZ images acquired by the scanner,
wherein the computer is configured to integrate brightness values of a plurality of pixels of each of XZ images in the Z-axis direction to generate an X image, and to combine the X image in the Y-axis direction to generate the XY image,
wherein the computer is configured to set an analysis region in each of the XZ images of a plurality of pieces of XZ images, and
wherein the computer is configured to perform processing background light subtraction on at least the analysis region before the XZ images are integrated in the Z-axis direction to generate the X image.

6. The device according to claim 5,
wherein the computer is configured to set an analysis region in each of the XZ images of a plurality of pieces of XZ images, and
wherein the computer is configured to perform processing for reducing brightness value of a plurality of pixels forming the region other than the analysis region before the XZ images are integrated in the Z-axis direction to generate the X image.

7. The device according to claim 5,
wherein the computer is configured to set an analysis region in each of the XZ images of a plurality of pieces of XZ images, and
wherein the computer is configured to perform processing for setting brightness values of a plurality of pixels forming the region other than the analysis region to 0 count before the XZ images are integrated in the Z-axis direction to generate the X image.

8. The device according to claim 5,
wherein the computer is configured to set a threshold value for extracting an analysis region based on brightness value of background light, and to set an analysis region in each of the XZ images of a plurality of pieces of XZ images based on the threshold value.

9. A method, comprising:
acquiring a plurality of pieces of XZ images of a sample in a Y-axis direction;
integrating brightness values of a plurality of pixels of each of XZ images in the Z-axis direction to generate an X image;
combining a plurality of the X image in the Y-axis direction to generate an XY image of the sample;
setting an analysis region in each of the XZ images of a plurality of pieces of XZ images; and
processing background light subtraction on at least the analysis region before the integrating.

10. The method according to claim 9, further comprising:
setting an analysis region in each of the XZ images of a plurality of pieces of XZ images, and
reducing brightness values of a plurality of pixels forming the region other than the analysis region before the integrating.

11. The method according to claim 9, further comprising:
setting an analysis region in each of the XZ images of a plurality of pieces of XZ images, and
setting brightness values of a plurality of pixels forming the region other than the analysis region to 0 count before the integrating.

12. The method according to claim 9, further comprising:
setting a threshold value for extracting an analysis region based on a brightness value of background light, and
setting an analysis region in each of the XZ images of a plurality of pieces of XZ images based on the threshold value.

* * * * *